United States Patent [19]

Kunugi et al.

[11] Patent Number: 4,513,114

[45] Date of Patent: Apr. 23, 1985

[54] POLYESTER COMPOSITION

[75] Inventors: Katsuo Kunugi; Togi Suzuki; Tadashi Konishi, all of Matsuyama; Shinji Ohwaki, Ibaraki, all of Japan

[73] Assignee: Teijin Limited, Osaka, Japan

[21] Appl. No.: 636,912

[22] Filed: Aug. 2, 1984

[51] Int. Cl.$^3$ .......................... C08K 3/02; C08K 3/32; C08K 5/49
[52] U.S. Cl. ..................................... 524/706; 524/707; 524/708; 524/709; 524/710; 524/711; 524/712; 524/713; 528/275; 528/286; 528/287
[58] Field of Search ............... 524/706, 707, 708, 709, 524/710, 711, 712, 713, 878; 528/275, 286, 287

[56] References Cited

U.S. PATENT DOCUMENTS

| | | | |
|---|---|---|---|
| 4,101,523 | 7/1978 | Watanabe et al. | 528/275 X |
| 4,115,371 | 9/1978 | Bier et al. | 528/286 X |
| 4,169,935 | 10/1979 | Hoheisel et al. | 528/287 |
| 4,454,312 | 6/1984 | Kuze et al. | 528/275 |

*Primary Examiner*—Lucille M. Phynes
*Attorney, Agent, or Firm*—Burgess, Ryan & Wayne

[57] ABSTRACT

A polyester composition with an excellent high-speed melt-spinning property, comprising
(A) 100 parts by weight of a matrix polyester resin comprising at least 80 molar % of an ethylene terephthalate recurring unit, and
(B) 0.2 to 7 parts by weight of a dispersoid dispersed in the matrix,
the dispersoid being such that, when it is contained in a predetermined amount (w) in a typical matrix polyester resin consisting of a polyethylene terephthalate having an intrinsic viscosity of 0.640, the resultant exemplary polyester composition satisfies the relationship (I):

$$-\frac{(\eta\dot{\gamma}_1(w) - \eta\dot{\gamma}_1(0)) - (\eta\dot{\gamma}_2(w) - \eta\dot{\gamma}_2(0))}{\dot{\gamma}_1 - \dot{\gamma}_2} \geqq \qquad (I)$$

$$83w^2 + 275w + 42$$

wherein: $\dot{\gamma}_1$=shearing rate of 0.01 sec$^{-1}$; $\dot{\gamma}_2$=shearing rate of 5.0 sec$^{-1}$; $\eta\dot{\gamma}_1(w)$=melt viscosity (poise=1/10 N·sec·m$^{-2}$) of the exemplary polyester composition at $\dot{\gamma}_1$; $\eta\dot{\gamma}_1(0)$=melt viscosity of matrix polyester resin at $\dot{\gamma}_1$; $\eta\dot{\gamma}_2(w)$=melt viscosity of the exemplary polyester composition at $\dot{\gamma}_2$; and $\eta\dot{\gamma}_2(0)$=melt viscosity of the matrix polyester resin at $\dot{\gamma}_2$.

5 Claims, 8 Drawing Figures

X 10000

X 10000

X 24000

X 10000

X 24000

POLYESTER COMPOSITION

BACKGROUND OF THE INVENTION

1. Field of the Invention

The present invention relates to a polyester composition. In particular, the present invention relates to a polyester composition which exhibits an enhanced fiber-forming (melt-spinning, drawing) property, film-forming property, and molding property, and which is capable of being converted to various polyester fibers, film, and other shaped articles having enhanced mechanical properties. More particularly, the present invention relates to a polyester composition extremely useful for producing polyester filaments having excellent mechanical properties, for example, excellent tensile strength and Young's modulus, by means of a high speed melt-spinning method.

2. Description of the Prior Arts

Polyester resins, especially, polyethylene terephthalate resin, are useful for producing various filaments, fibers, films, and other shaped articles, because they exhibit excellent physical and chemical properties.

The polyester resins are produced usually in such a manner that an ester of an aromatic dicarboxylic acid with an alkylene glycol or its oligomer is produced by esterifying the aromatic dicarboxylic acid, especially, terephthalic acid, with the alkylene glycol, especially, ethylene glycol; by ester-interchanging an alkyl terephthalate with ethylene glycol; or by reacting terephthalic acid with ethylene oxide, and then subjecting the ester or its oligomer to a polycondensation-polymerization procedure to provide a polyester resin having a desired degree of polymerization.

The polyester resin produced by the above-mentioned process can be converted to shaped articles, for example, filaments or film, by melting the resin and extruding the melt through a spinneret having at least one orifice or a film-forming slit. If necessary, the extruded article is drawn at a predetermined draw ratio.

In a process for producing polyester filaments, a polyester resin melt may be extruded through a spinneret, solidified, and then wound up at a high speed of 2,000 m/min or more. The resultant intermediate oriented filaments are then draw-false-twisted, as disclosed in U.S. Pat. No. 3,771,307. This process is widely used in the polyester filament-producing industry.

Recently, U.S. Pat. No. 4,425,293 disclosed a process for producing polyester filaments, having a high level of physical properties sufficient for practical industrial use, only by a high speed melt spinning process at a high speed of 5000 m/min or more, without drawing the resultant melt-spun filaments.

However, in the high speed melt-spinning process, the high speed melt-spinning operation at a spinning rate of 5000 m/min or more causes a number of breakages of the individual filaments or filament bundle to increase, and thus the resultant filaments will contain broken individual filaments or fluffs and therefore, will exhibit a poor processability. The above-mentioned phenomenon becomes remarkable with a decrease in the denier of the individual filaments and with an increase in the number of the individual filaments in the melt spun filament bundle. Therefore, in practice, it is very difficult to carry out the industrial melt-spinning process at a very high winding speed of 6000 m/min or more.

In the filament-producing industry, however, it is strongly desired to provide, at a high speed, polyester filaments or fibers having high physical and mechanical properties, especially, a high tensile strength and an enhanced Young's modulus. These filaments are then highly susceptible to the finishing process, spinning process, and weaving or knitting process at a high productivity rate, and are useful for producing fiber or filament products having satisfactory functions and quality.

In the high speed melt-spinning process which is capable of producing polyester filament having satisfactory physical properties without drawing the melt-spun filaments, it is necessary to carry out the process at a very high winding speed of 5000 m/min or more. Even at the high speed of 5000 m/min or more, the resultant polyester filaments exhibit a tensile strength and Young's modulus lower than those of the filaments produced by a conventional melt-spinning-drawing process.

Accordingly, it is desired to provide a polyester resin which is susceptible to the high speed melt-spinning process and can be converted to polyester filaments having a satisfactory tensile strength and Young's modulus.

In the high speed melt-spinning process for polyester resins, it is known to disperse titanium oxide or silica in the polyester resin matrix. In this type of polyester composition, it was considered that the fine solid particles of the above-mentioned inorganic substances serves to enhance intermolecular slippage of the polyester molecular chains in the melt, to cause a rapid relaxation of the polyester molecule chains when the melt is deformed at a high speed, to prevent an undesirable concentration of stress at points at which the polyester molecular chains are entangled with each other, and which restrict orientation and crystallization of the polyester molecular chains. The above-mentioned effect of the solid fine particles is the so-called roller effect.

Generally, where fine solid particles are dispersed in a polymer matrix, the melt viscosity of the resultant polymer composition is increased. This phenomenon occurs because there is a viscosity-increasing effect in the slip plane between the fine solid particles and the polymer matrix, due to an interfacial formation of two electrical layers between the fine solid particles and the polymer matrix. Also, it is known that the increase in the melt viscosity becomes remarkable with a decrease in shearing speed applied to the melt of the polyester composition. This phenomenon occurs because, at a low shearing speed, the aggregation or network structure of the solid particles with each other and/or the solid particles with the polymer matrix is maintained stable, whereas, at a high shearing speed, the aggregation or network structure is ruptured, and therefore, the increase in the melt viscosity of the polyester composition derived from the solid fine particle becomes small.

In view of the above-mentioned phenomena, it was discovered by the inventors of the present invention that the fine solid particles of titanium dioxide or silica dispersed in the polyester resin matrix has no roller effect and restricts the intermolecular slip of polyester molecular chains. Also, the inventors discovered that the improvement in the high speed melt-spinning property of the polyester resin composition due to the solid fine particles of titanium dioxide or silica is mainly contributed to by another effect of the solid fine particle, that is, the restriction effect on orientation and crystallization of the polyester molecular chains.

However, it is very difficult to provide a polyester composition having very fine solid dispersoid dispersed in a polyester resin matrix by using conventional very fine solid particles. For example, when conventional fine solid particles, for example, colloidal silica or dry process silica particles, having a primary particle size of from 5 to 50 millimicrons are dispersed in a polymerization mixture for producing a matrix polyester resin and then the polymerization mixture is converted to a polyester composition at an elevated temperature, the fine solid particles are agglomerated by the action of the heat to form large secondary agglomerates having a size of 100 millimicrons or more. The large agglomerates are not effective for improving the melt viscosity property of the polyester composition.

The inventors of the present invention discovered that when 0.5 part by weight of tricalcium diphosphate ($Ca_3(PO_4)_2$) are dispersed in 100 parts by weight of a polyethylene terephthalate resin matrix by reacting isopropyl acid phosphate with calcium acetate in at least one stage of procedures for producing the polyethylene terephthalate, the resultant polyester composition exhibits a remarkably increased melt viscosity at a low shearing rate.

Further, the inventors of the present invention discovered that the dispersed tricalcium diphosphate is in the form of a number of primary fine particles and a number of secondary agglomerates consisting of a plurality of the primary fine particle, the secondary agglomerates having a size of about 50 millimicrons or less and the increased entire surface area of the primary fine particles and secondary agglomerates contributes to the remarkable increase in the melt viscosity of the resultant polyester composition.

However, it was desired to provide a polyester composition wherein more fine solid particles are more stably, evenly dispersed in a polyester resin matrix than that described above.

SUMMARY OF THE INVENTION

An object of the present invention is to provide a polyester composition having an enhanced fiber-forming property, film-forming property, and other shaping property at a high speed and capable of producing fiber, filaments, fibers, and other shaped articles having satisfactory physical properites.

Another object of the present invention is to provide a polyester composition usable for producing polyester fibers or filament having industrially satisfactory physical properties by means of a high speed melt-spinning process at a high melt-spinning speed of 5000 m/min.

The above-mentioned objects can be attained by the polyester composition which comprises:

(A) 100 parts by weight of a matrix polyester resin comprising at least 80 molar % of recurring ethylene terephthalate unit of the formula

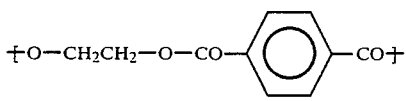

and (B) 0.2 to 7 parts by weight of a dispersoid in the form of primary fine solid particles and/or secondary agglomerates each consisting of a plurality of the primary fine particles, dispersed in the matrix polyester resin, the dispersoid being such that, when it is contained in a predetermined amount in a typical matrix polyester resin consisting of a polyethylene terephthalate having an intrinsic viscosity of 0.640, the resultant polyester composition satisfies the relationship (I):

$$-\frac{(\eta\dot{\gamma}_1(w) - \eta\dot{\gamma}_1(0)) - (\eta\dot{\gamma}_2(w) - \eta\dot{\gamma}_2(0))}{\dot{\gamma}_1 - \dot{\gamma}_2} \geqq 83w^2 + 275w + 42 \quad (I)$$

wherein w represents the amount in % by weight of the dispersoid based on the entire weight of the polyester composition; $\dot{\gamma}_1$ and $\dot{\gamma}_2$ represent shearing rates of 0.01 sec$^{-1}$ and 5.0 sec$^{-1}$, respectively; $\eta\dot{\gamma}_1(w)$ and $\eta\dot{\gamma}_2(w)$ represent melt viscosities in poise (1/10 N·sec·m$^{-2}$) of the polyester composition containing w % by weight of the dispersoid, determined at shearing rates of $\dot{\gamma}_1$ and $\dot{\gamma}_2$, respectively; $\eta\dot{\gamma}_1(0)$ and $\eta\dot{\gamma}_2(0)$ represent melt viscosities in poise (1/10 N·sec·m$^{-2}$) of the matrix polyester resin free from the dispersoid, determined at shearing rates of $\dot{\gamma}_1$ and $\dot{\gamma}_2$, respectively.

The specific dispersoid satisfying the relationship (I) is highly effective for strictly restricting the intermolecular movement of the polyester molecular chains so as to remarkably restrict the orientation and crystallization of the polyester molecular chains in the high speed melt-spinning process.

DESCRIPTION OF THE PREFERRED EMBODIMENTS

Figure 1:
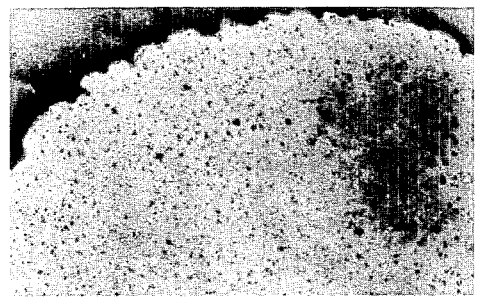
FIGS. 1 and 2 are transmission type electron microscope photographs showing partial cross-sectional profiles of a conventional polyester fiber produced by means of a high speed melt-spinning process, at magnifications of 10,000 and 24,000, respectively.

The polyester composition of the present invention comprises 100 parts by weight of a specific matrix polyester resin and 0.2 to 7 parts by weight of a specific dispersoid dispersed in the matrix polyester resin.

The matrix polyester resin of the present invention comprises at least 80 molar % of recurring ethylene terephthalate unit of the formula:

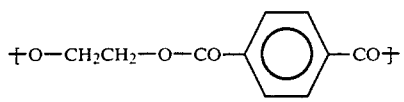

A typical polyester resin usable for the present invention is a polyethylene terephthalate homopolymer which is obtainable from an acid component such as terephthalic acid or an ester forming derivative thereof, and a glycol component, such as ethylene glycol or an ester-forming derivative thereof.

In the polyester resin of the present invention, a small portion of the terephthalic acid component may be replaced by at least one copolymerizable dicarboxylic acid, and/or a small portion of the ethylene glycol component may be replaced by at least one copolymerizable diol compound.

The copolymerizable dicarboxylic acids may be selected from aromatic dicarboxylic acids, for example, isophthalic acid, phthalic acid, alkyl-substituted phthalic acids, e.g., methylterephthalic acid and methylisophthalic acid, naphthalene-dicarboxylic acids, e.g., naphthalene-2,6-dicarboxylic acid, naphthalene-2,7-dicarboxylic acid, naphthalene-1,5-dicarboxylic acid, diphenyldicarboxylic acids, diphenoxyethane dicarboxylic acids, e.g., 4,4'-diphenoxyethanedicarboxylic acid and 5-sodiumsulfo-isophthalic acid; aliphatic dicarboxylic acids, for example, succinic acid, adipic acid, sebacic acid, azelaic acid, and decadicarboxylic acid; and alicyclic dicarboxylic acids, for example, cyclohexanedicarboxylic acid.

The copolymerizable diol compounds may be selected from aliphatic and alicyclic diols, such as trimethylene glycol, tetramethylene glycol, hexamethylene glycol, neopentyl glycol, diethylene glycol, cyclohexane-1,4-dimethanol; dihydroxybenzenes, such as hydroquinone and resorcinol; bisphenols, such as 2,2-bis(4-hydroxydiphenyl)-propane (bisphenol A) and 2,2-bis(4-hydroxydiphenyl)-sulfone (bisphenol S), polyoxyalkylene glycols, and aromatic diols, such as ether diols obtainable from bisphenols and glycols such as ethylene glycol.

Also, hydroxycarboxylic acids, such as ε-hydroxycaproic acid, p-hydroxybenzoic acid, and β-hydroxyethoxybenzoic acid are usable as a part of the acid component.

The preferable copolymerizable acid component may be selected from p-hydroxybenzoic acid, p-acetoxybenzoic acid, and ester-forming derivatives thereof, which are effective for restricting orientation and crystallization of the polyester molecules in the high speed melt-spinning process.

As long as the resultant polyester copolymer is a substantially linear copolymer, the copolymerizable acid component may be selected from polycarboxylic acids, for example, trimellitic acid and pyromellitic acid and the copolymerizable glycol component may be selected from polyol compounds, for example, glycerin, trimethylol propane, and pentaerythritol.

These copolymerizable components may be employed alone or as a mixture of two or more thereof, and are employed in an amount of not more than 20 molar %, preferably, 10 molar % or less, of the total amount of the acid component (hydroxycarboxylic acids should be calculated as a half thereof being the carboxylic acid), or of the glycol component.

The polyester resin usable for the present invention can be prepared by a usual polymerization method, for example, a melt polymerization method or a combination of a melt polymerization and solid phase polymerization.

For example, the polyethylene terephthalate homopolymer resin can be prepared by a process such that terephthalic acid is directly esterified with ethylene glycol, or a lower alkyl ester of terephthalic acid, for example, dimethyl terephthalate, is subjected to an ester interchange reaction with ethylene glycol, or terephthalic acid is reacted with ethylene oxide, and the resultant terephthalic acid-ethylene glycol ester or its oligomer is subjected to a polycondensation polymerization process at an elevated temperature under a reduced pressure for a time period long enough to obtain a polymer having a desired degree of polymerization.

The polyester resin usable for the present invention preferably has an intrinsic viscosity of 0.300 or more, determined in a solvent consisting of ortho-chlorophenol at a temperature of 35° C.

The dispersoid usable for the present invention comprises at least one organic or inorganic solid substance which is non-copolymerizable with the polyester resin and is in the form of primary fine solid particles and/or secondary agglomerates each consisting of a plurality of the fine particles.

The dispersoid usable for the present invention must satisfy the relationship (I) when the dispersoid is contained in a predetermined amount in a typical matrix polyester resin consisting of a polyethylene terephthalate homopolymer having an intrinsic viscosity of 0.640 determined in o-chlorophenol at a temperature of 35° C.

If the relationship (I) is not satisfied by the dispersoid, the resultant polyester resin composition containing the dispersoid will exhibit an unsatisfactory high speed melt-spinning property.

In the polyester composition of the present invention, it is preferable that the dispersoid consist of the primary fine solid particles and/or the secondary agglomerates having an average size corresponding to ⅓ or less, more preferably, 1/10 or less, of the average length of the polyester molecular chains in the matrix polyester resin, and that the dispersoid contains no large secondary agglomerates having a size corresponding to ½ or more of the average length of polyester molecular chains in the matrix polyester resin.

The size of the primary fine solid particle or secondary agglomerate is represented by a diameter of a sphere which circumscribes the primary fine solid particle or secondary agglomerate, and is determined by means of microscopic observation.

The average length of the polyethylene terephthalate molecular chains in a stable trans-structure is as follows

| Intrinsic viscosity of polyester resin | Average length of polyester molecular chains |
|---|---|
| 0.3 | About 400 Ångstrom |
| 0.35 | About 520 Ångstrom |
| 0.45 | About 700 Ångstrom |
| 0.64 | About 1,100 Ångstrom |
| 0.72 | About 1,300 Ångstrom |

When the size of the dispersoid particle is ⅓ times or less the average length of the polyester molecular chain, the length of the polyester molecular chain is long enough to wind at least one time around the dispersoid particle. That is, the dispersoid particles in the average size of ⅓ or less of the average length of the polyester molecular chains are not negligible against the movement of the polyester molecular chains, that is, are effective for restricting the movement of the polyester molecular chains.

If the average size of the dispersoid particles is more than ⅓ of the average polyester molecular chain length, usually, the dispersoid particles in the matrix polyester resin are not effective for restricting the movement of the polyester molecular chains and therefore, are useless for restricting the orientation and crystallization of the polyester molecular chains.

In the polyester molecular chains, the ethylene radicals have a very large flexibility. Therefore, the polyester molecular chains can be deemed as free-bonding chains. The free-bonding chains have a turning radius satisfying the relationship.

$$<S_0^2> = 1/6n\, b^2$$

wherein $<S_0^2>$ represents a square average turning radius of a free-bonding chain; n represents the number of bonds (that is, the degree of polymerization); and b represents a length of a recurring unit.

In the case of polyethylene terephthalate, the length of the recurring unit:

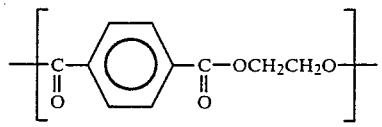

is about 10 Ångströms (b=10 Å) when the recurring unit is in a stable trans-structure.

A polyethylene terephthalate having an intrinsic viscosity of 0.64 has a degree of polymerization of about 100, and an average length of the molecular chains of 100b. Therefore, the square average turning radius ($<S_0^2>$) is $$S_0^2 = 1/6 \times 100 \times b^2;$$

the turning radius of the molecular chains is $$\{<S_0^2>\}^{\frac{1}{2}} = 10/6 \times b \approx 5b;$$

and the turning diameter is $5b \times 2 = 10b$.

When the average size of the dispersoid particles is 1/10 or less of the average length (100b) of the polyester molecular chains, the average size of the dispersoid particles is the same as or smaller than the turning diameter of the polyester molecular chains.

The dispersoid particles having the above-mentioned average size and dispersed in the matrix polyester resin, are highly restrictive toward the movement, i.e., orientation and crystallization, of the polyester molecular chains.

The dispersoid useful for the present invention can be formed and uniformly dispersed in a matrix polyester resin in such a manner that, for example, in at least one stage of procedures for producing the matrix polyester resin, the reaction mixture is admixed with a mixture of:

(a) at least one phosphorus compound of the formula (II):

wherein $R^1$ and $R^2$ represent, independently from each other, a member selected from a hydrogen atom, and monovalent organic radicals, respectively; X represents a member selected from a hydrogen atom, monovalent organic radicals, and metal atoms; and n represents zero or 1;

(b) at least one alkaline earth metal compound in an amount such that the sum of the equivalent numbers of the metals contained in the above-mentioned phosphorus compound (a) and the alkaline earth metal compound (b) is in the range of from 2.0 times to 3.2 times the molar amount of the phosphorus compound (a); and (c) a dispersing agent consisting of at least one member selected from quaternary ammonium compounds and quaternary phosphonium compounds and in an amount of 0.01 to 35 molar % based on the molar amount of the phosphorus compound (a).

In the formula (II), representing the phosphorus compound (a) $R^1$ and $R^2$ separately represent a hydrogen atom or a monovalent organic radical, preferably a monovalent organic radical, for example, an alkyl radical preferably having 1 to 40 carbon atoms, an aryl radical, an aralkyl radical, or a radical of the formula $-[(CH_2)_lO]_k-R^5$ wherein $R^5$ represents a member selected from a hydrogen atom, alkyl radicals, aryl radicals, and aralkyl radicals; l represents an integer of 2 or more; and k represents an integer of 1 or more.

Also, in the formula (II), X represents a hydrogen atom, a monovalent organic radical, or a metal atom, preferably, a monovalent or divalent metal atom, for example, an alkali metal atom such as Li, Na, or K, or an alkaline earth metal atom such as Mg, Ca, Sr or Ba, more preferably a calcium atom (Ca). In the formula (II), the monovalent organic radical represented by X may be the same as or different from the monovalent organic radical represented by $R^1$ and/or $R^2$.

The phosphorus compound of the formula (II) is preferably selected from normal phosphoric acid; phosphoric acid triesters, for example, trimethyl phosphate, triethyl phosphate, tributyl phosphate and triphenyl phosphate; phosphoric acid mono- and di-esters, for example, monomethyldihydrogen phosphate, dimethyl monohydrogen phosphate, monoethyldihydrogen phosphate, diethylmonohydrogen phosphate, monobutyldihydrogen phosphate, and dibutylmonohydrogen phosphate; phosphorous acid; phosphorous acid triesters, for example, trimethyl phosphite, triethyl phosphite, and tributyl phosphite; phosphorous acid mono- and di-esters, for example, monomethyldihydrogen phosphite, dimethylmonohydrogen phosphite, monoethyldihydrogen phosphite, diethylmonohydrogen phosphite, monobutyldihydrogen phosphite, and dibutylmonohydrogen phosphite; reaction products of the above-mentioned phosphorus compounds with a glycol compound and/or water; and metal-consisting phosphorus compounds which are reaction products of the above-mentioned phosphorus compounds with a predetermined amount of a metallic compound selected from alkali metal compounds, for example, compounds of Li, Na, and K, and alkaline earth metal compounds, for example, compounds of Mg, Ca, Sr and Ba.

In the preparation of the above-mentioned metal-containing phosphorus compound, phosphoric acid, a phosphoric acid mono, di or triester, phosphorous acid or a phosphorous acid mono, di or triester reacts with a metal compound in a reaction medium at an elevated temperature. The reaction medium preferably consists of a glycol compound, more preferably, the same glycol compound as that used to produce the matrix polyester resin.

The alkaline earth metal compound (b) is not limited to a special group of compounds as long as the compound is reactive with the phosphorus compound (a) to provide a non-soluble salt. The compound (b) can be selected from organic carboxylic acid salts, for example, acetates, oxalates, benzoates, phthalate, and stearates of the alkaline earth metal; inorganic salts, for example, borates, sulfates, silicates, carbonates, and bicarbonates, of alkaline earth metals; halides, for example, chlorides, of alkaline earth metals; chelate compounds, for example, ethylenediamine tetraacetates, of alkaline earth metals; hydroxides and oxides of alkaline earth metals; and alcoholates and phenolates, for example, methylates, ethylates, and glycolates, of alkaline earth metals.

Preferable alkaline earth metal compounds (b) are ethyleneglycol-soluble organic carboxylic acid salts, halides, chelate compounds, and alcoholates of alkaline earth metals. More preferable compounds (b) are ethyleneglycol-soluble organic carboxylic acid salts of alkaline earth metals, still more preferably, calcium (Ca).

The dispersing agent (C) usable for the present invention consists of at least one member selected from quaternary ammonium compounds and quaternary phosphonium compounds.

The quaternary ammonium compounds may be selected from tetramethylammonium hydroxide, tetramethylammonium chloride, tetraethylammonium hydroxide, tetraethylammonium chloride, tetraethylammonium bromide, tetraethylammonium iodide, tetrapropylammonium hydroxide, tetrapropylammonium chloride, tetraisopropylammonium hydroxide, tetrabutylammonium hydroxide, tetrabutylammonium chloride, tetraphenylammonium hydroxide, tetraphenylammonium chloride and tetraethylammonium tosylate.

The quaternary phosphonium compounds usable for the present invention, may be selected from those of the formula (III):

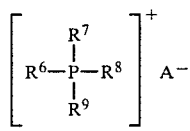

wherein $R^6$, $R^7$, $R^8$ and $R^9$ respectively represent, independently from each other, a member selected from non-substituted and substituted alkyl, cycloalkyl, aryl, and aralkyl radicals; $R^8$ and $R^9$ may be fused together with each other to form a cyclic structure with the phosphorus atom; and A represents an anion residue, preferably selected from halides, hydroxide, hydrosulfate, alkylsulfates, alkylethersulfates, alkylsulfonates, alkylbenzenesulfonates, acetate, and fatty acid anionic residue.

Preferable quaternary phosphonium compounds are
tetramethylphosphonium chloride;
tetramethylphosphonium bromide;
tetramethylphosphonium iodide;
tetramethylphosphonium hydroxide;
tetraethylphosphonium chloride;
tetrapropylphosphonium chloride;
tetraisopropylphosphonium chloride;
tetrabutylphosphonium chloride;
tetrabutylphosphonium bromide;
tetrabutylphosphonium iodide;
tetrabutylphosphonium hydroxide;
butyltriphenylphosphonium chloride;
ethyltrioctylphosphonium chloride;
hexadecyltributylphosphonium chloride;
ethyltrihexylphosphonium chloride;
cyclohexyltributylphosphonium chloride;
benzyltributylphosphonium chloride;
tetraphenylphosphonium chloride;
tetraphenylphosphonium hydroxide;
octyltrimethylphosphonium chloride;
octyldimethylbenzylphosphonium chloride;
lauryldimethylbenzylphosphonium chloride;
lauryldimethylbenzylphosphonium hydroxide;
stearyltrimethylphosphonium chloride;
lauryltrimethylphosphonium ethosulfate;
laurylbenzenetrimethylphosphonium methosulfate;
lauryldimethyl-o-chlorobenzylphosphonium chloride;
stearylethyldihydroxyethylphosphonium ethosulfate;
tetraethylphosphonium acetate;
tetraethylphosphonium dodecylbenzenesulfonate;
tetraethylphosphonium stearate; and
tetraethylphosphonium oleate.

In the polyester composition of the present invention, the content of the dispersoid in the matrix polyester resin is in the range of from 0.2 to 7 parts by weight, preferably, from 0.2 to 3 parts by weight, per 100 parts by weight of the matrix polyester resin. If the content of the dispersoid is less than 0.2 parts by weight, the contribution of the dispersoid on the improvement in the melt viscosity property of the resultant polyester composition is unsatisfactory. If the content of the dispersoid is more than 7 parts by weight, the resultant polyester composition exhibits unsatisfactory tensile strength and Young's modulus, because the large amount of dispersoid hinders the formation of a desirable internal structure of the shaped article.

Accordingly, in the preparation of the polyester composition of the present invention, the phosphorus compound (a) should be used in an amount adequate for forming the corresponding dispersoid in an amount of 0.2 to 7 parts by weight par 100 parts by weight of the matrix polyester resin.

Accordingly, in the preparation of the polyester composition of the present invention, the phosphorus compound (a) should be used in an amount adequate for forming the corresponding dispersoid in an amount of 0.2 to 7 parts by weight par 100 parts by weight of the matrix polyester resin.

The alkaline earth metal compounds (b) is used in an amount adequate for adjusting the sum of the equivalent numbers of the metals contained in the phosphorus compound (a) and the alkaline earth metal compound (b) to from 2.0 times to 3.2 times the molar amount of the phosphorus compound (a).

If the above-mentioned sum is less than 2.0 times the molar amount of the phosphorus compound (a), even in the presence of the dispersing agent, the resultant dispersoid particles have an undesirably large average size, that is, contain an excessively large amount of large secondary agglomerates, which hinder the enhancement of the melt viscosity property of the resultant polyester composition. Also, the softening point of the resultant polyester composition becomes undesirably low.

If the sum of the equivalent numbers of the metals in the phosphorus compounds (a) and the alkaline earth metal compound (b) is more than 3.2 times the molar amount of the phosphorus compound (a), even in the presence of the dispersing agent, the resultant dispersoid contains an excessively large amount of large secondary agglomerates and therefore, the resultant polyester composition exhibits an unsatisfactory melt viscosity property.

The dispersing agent is used preferably in an amount of 0.01 to 35 molar %, more preferably from 0.1 to 10 molar %, based on the molar amount of the phosphorus compound (a).

If the amount of dispersing agent is less than 0.1 molar %, it becomes difficult to satisfactorily disperse the resultant dispersoid in a satisfactorily small particle size evenly in the matrix polyester resin. If the dispersing agent is used in an excessively large amount of more than 35 molar %, the excessive amount of the dispersing agent over 35 molar % is not effective for enhancing the dispersing effect of the dispersing agent, and results in undesirable discoloration (yellowing) of the resultant polyester composition.

In the preparation of the polyester composition of the present invention, it is preferable that a dispersoid-forming mixture of the phosphorus compound (a), the alkaline earth metal compound (b), and the dispersing agent (C) is admixed with a reaction mixture for producing the matrix polyester resin at least one stage of the matrix polyester resin-producing procedures. Also, it is preferable that, before the mixture is admixed with the reaction mixture, the phosphorus compound (a) and the alkaline earth metal compound (b) have not yet reacted with each other. That is, during the matrix polyester resin-producing procedures, the phosphorus compound (a) reacts with the alkaline earth metal compound (b) so as to form the dispersoid, and the resultant dispersoid is evenly dispersed, in the form of primary fine solid particles and/or secondary agglomerates consisting of a plurality of the primary particles, in the reaction mixture and then in the resultant polyester resin matrix.

If the reaction product of the phosphorus compound (a) with the alkaline earth metal compound (b) is admixed into the polymerization mixture or the matrix polyester composition, the resultant dispersoid contains a large amount of large secondary agglomerates, and therefore, the resultant polyester composition exhibits an unsatisfactory melt viscosity property.

The admixing step of the dispersoid-forming mixture can be carried out in any stage of the matrix polyester resin-producing process in any order. However, it is preferable that, after the reaction in the first step of the matrix polyester resin-producing procedures is substantially completed, a mixture of at least 80% of the entire weight of the alkaline earth metal compound, the entire amount of the phosphorus amount, and the entire amount of the dispersing agent is admixed with the reaction mixture.

If the phosphorus compound (a) only is admixed into the reaction mixture before the above-mentioned first stage reaction is completed, the admixed phosphorus compound (a) sometimes hinders the completion of the first step reaction.

If the alkaline earth metal compound (b) only is admixed into the reaction mixture before the first stage reaction is completed, and if the first step reaction is an esterification reaction between a dicarboxylic acid component and a glycol component, a number of coarse particles are sometimes produced in the reaction mixture. Also, if the first step reaction is an ester interchange reaction of a dicarboxylic ester component with a glycol component, the alkaline earth metal compound sometimes serves as a catalyst, and therefore, the ester-interchange reaction is carried out at an irregularly rapid reaction rate and a bumping phenomenon occurs in the reaction mixture. Therefore, the amount of the alkaline earth metal compound (b) to be admixed to the reaction mixture in the first step reaction is limited, preferably to 20% by weight of the entire amount thereof.

Where the dispersoid-forming mixture is admixed into a polymerization mixture in the second step reaction of the matrix polyester resin-producing procedures, it is preferable that the admixing procedure be carried out before the limiting viscosity number of the polymerization mixture reaches 0.3. If the admixing procedure is carried out at a later stage of the second step reaction in which the polymerization mixture exhibits a large limiting viscosity number of more than 0.3, undesirable coarse particles and agglomerates are sometimes produced in the polymerization mixture.

The dispersoid-forming mixture can be admixed in a single admixing operation, or in two or more intermittent admixing operations, or in a continuous admixing operation into the reaction mixture.

The dispersing agent can be admixed into the reaction mixture in any stage of the matrix polyester resin-producing procedures. For example, the dispersing agent may be mixed with the reaction components before the start of a first step reaction, or with a reaction mixture during the first step reaction or after the first step reaction is completed but before a second step reaction is started, or during the second step reaction.

Where the first step reaction is the ester change reaction, some of the quaternary ammonium and phosphonium compounds used as a dispersing agent serve as a catalyst for the ester interchange reaction. Where the first step reaction is the etherification reaction, some of the quaternary ammonium and phosphonium compounds restrict the etherification reaction and therefore, can be utilized as a etherification retarder. Also, some of the quaternary ammonium and phosphonium compounds have a catalytic activity for the second step reaction, and therefore, can be utilized as a second step reaction promotor.

Usually, it is preferable that the dispersing agent (c) is admixed together with the phosphorus compound (a) and/or the alkaline earth metal compound (b), more preferably, in the form of a clear solution containing all of these items.

Figure 2:
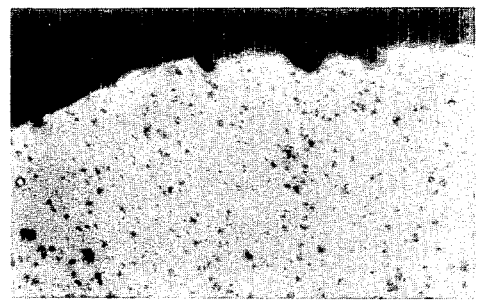

FIGS. 1 and 2 show transmission type electron microscopic partial cross-sectional profiles of a conventional polyester fiber produced by means of a high speed melt-spinning process and containing fine solid particles which do not satisfy the relationship (I), at magnifications of 10,000 and 24,000, respectively.

Figure 3:
FIGS. 3 and 4 are transmission type electron microscope photographs showing partial cross-sectional profiles of the polyester fiber produced from the polyester composition of the present invention by means of a high speed melt-spinning process.
Figure 4:

FIGS. 3 and 4 show transmission type electron microscopic partial cross-sectional profiles of a polyester fiber produced from the polyester composition by means of the high speed melt-spinning process, at magnifications of 10,000 and 24,000, respectively.

In the preparation of the conventional polyester fibers as shown in FIGS. 1 and 2, a polyester composition was prepared by admixing a mixture of isopropyl acid phosphate with calcium acetate into a reaction mixture for producing a polyester resin, and by converting the reaction mixture to the polyester resin while the isopropyl acid phosphate and calcium acetate react with each other to provide 0.5 parts by weight of calcium phosphate in the form of fine particles dispersed in 100 parts by weight of the resultant polyester resin matrix. The resultant polyester composition was then converted to polyester fibers by means of a high speed melt-spinning process.

In the process of producing the polyester fiber as shown in FIGS. 3 and 4, the same procedures as those described above were carried out except that the isopropyl acid phosphate and calcium acetate were mixed with tetraethylammonium hydroxide in an amount of 2.9 molar % based on the molar amount of the isopropyl acid phosphate.

FIGS. 1 and 2 show that the size of the secondary agglomerates dispersed in the conventional polyester fiber is about 50 millimicrons or less, whereas FIGS. 3 and 4 show that the size of the secondary agglomerates dispersed in the polyester fiber produced from the polyester composition of the present invention is about 5 millimicrons or less.

Also, it was confirmed by the inventors of the present invention that the high speed melt-spinning property of the polyester composition of the present invention used to produce the polyester fiber indicated in FIGS. 3 and 4 is remarkably better than that of the polyester composition of FIGS. 1 and 2.

From the above-mentioned phenomena, it is concluded that the specific dispersing agent of the present invention is effective for making the size of the primary fine solid particles small and for restricting the secondary agglomeration of the primary fine solid particles. The above-mentioned effect of the dispersing agent is also effective for increasing the entire surface area of the dispersed primary fine solid particles and the secondary agglomerate. This increased entire surface area is effective for increasing the frictional resistance between the dispersed particle and agglomerate surfaces and the polyester molecular chains and therefore, for increasing the melt viscosity of the polyester composition. Also, the increased entire surface area of the primary fine solid particles and secondary agglomerates is effective for increasing electric viscosity created between the particles and agglomerates and the polyester molecular chains, the intensity of the electric viscosity being variable depending on the type of the dispersoid, and is contributive to enhancing the aggregation or network structure formation of the primary particles, the secondary agglomerates, and the polyester molecular chains. These phenomena are not independent from each other, but cooperate with each other so as to contribute to an increase in the melt viscosity of the resultant polyester composition at a low shearing rate.

However, at a high shearing rate, the above-mentioned aggregation or network structure is ruptured and therefore, the increase in the melt viscosity of the polyester composition becomes small.

In the high speed melt-spinning process, a polyester resin having a high degree of polymerization, of which the melt viscosity is large in all over the shearing rates applied thereto, exhibits a poor melt flow property at a spinning nozzle portion at which a shearing rate of about $10^3$ to about $10^4$ sec$^{-1}$ is applied to the polyester resin melt. This phenomenon increases the necessary load for the melt.

In the polyester composition of the present invention, however, the melt flow property of the polyester composition melt at the spinning nozzle portion is always satisfactory, because the increase in the melt viscosity of the polyester composition is very small at a high shearing rate.

In the high speed melt-spinning process, after passing through the spinning nozzle, the shearing rate applied to the melt is very small. At this small shearing rate, while corresponds to a deformation rate of $10^3$ sec$^{-1}$ or less, the specific dispersoid of the present invention increases the melt viscosity of the polyester composition of the present invention. This phenomenon is very effective for restricting orientation and crystallization of the polyester molecular chains. Even if a number of very fine crystals are produced in the polyester composition melt in the high speed melt-spinning process, the high melt viscosity of the polyester composition of the present invention is highly contributive to restricting the growth of the very fine crystals. Accordingly, the polyester composition of the present invention can exhibit an extremely enhanced high-speed melt-spinnability.

The above-mentioned specific contribution of the specific dispersoid satisfying the relationship (I) to the melt flow property of the polyester composition was discovered for the first time by the inventors of the present invention.

The specific effects of the dispersoid of the present invention will be further explained by means of FIGS. 5, 6, 7, and 8.

By using a differential scanning calorimeter (DSC), a sample (A, D, or E) of a polyester resin was heated to a temperature of 300° C. at a heating rate of 20° C./min, was maintained at this temperature for 10 minutes, and was then kept standing at room temperature for a period sufficient to allow the sample to naturally cool to the room temperature. The temperature-lowering crystallization temperature and DSC temperature-lowering crystallization peak area ratio of the sample were measured.

Figure 5:
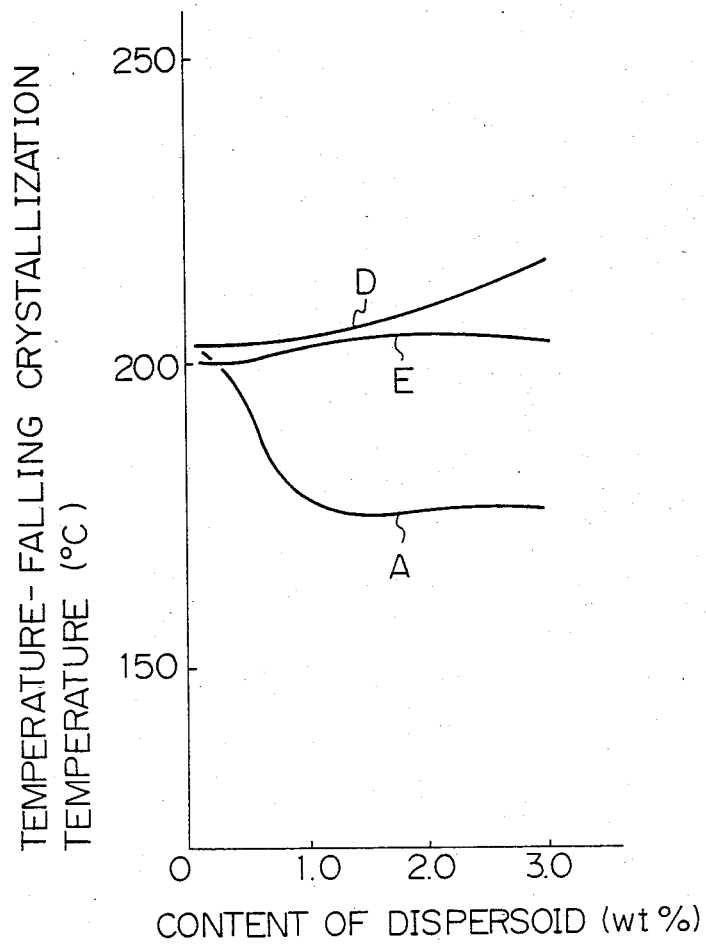
FIG. 5 is a diagram showing a relationship between the content of the dispersoid in a matrix polyester resin and the temperature-lowering crystallization temperature of the matrix polyester resin.
Figure 6:
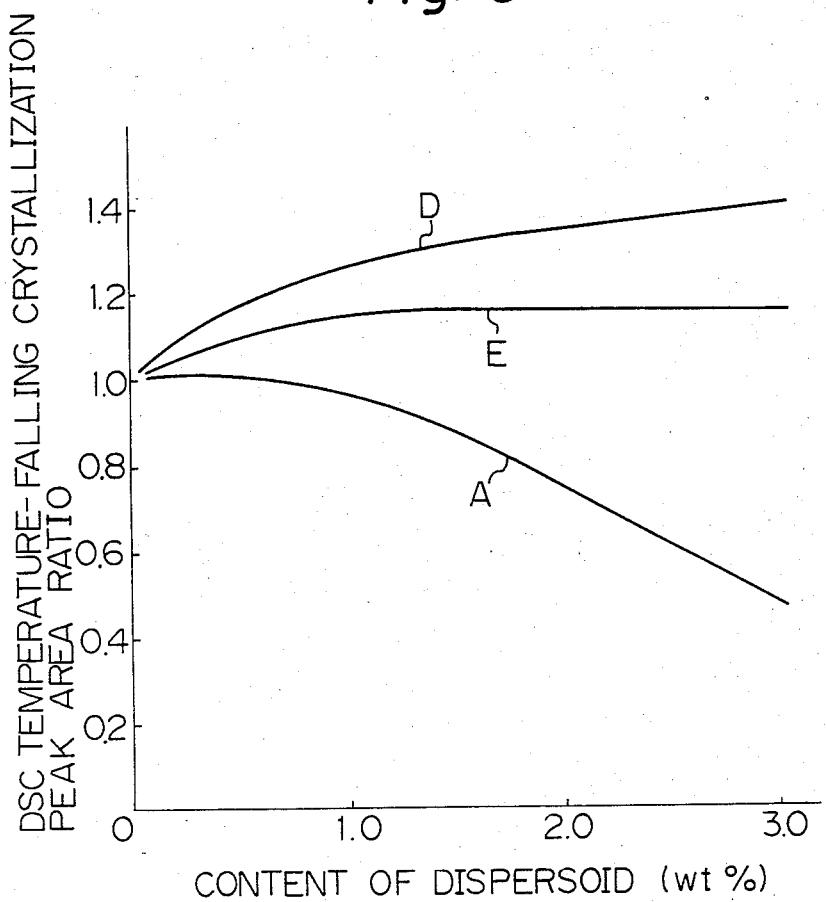
FIG. 6 is a diagram showing a relationship between the content of the dispersoid in the matrix polyester resin and the DSC temperature-lowering crystallization peak area ratio.

Sample A was prepared in such a manner that 1 molar part of isopropyl acid phosphate and 1.5 molar parts of calcium acetate were added in amounts adequate to produce the amount of calcium phosphate indicated in FIGS. 5 and 6, together with tetraethylammonium hydroxide in an amount of 2.9 molar % based on the molar amount of isopropyl acid phosphate, to a ester-interchange reaction mixture of dimethyl terephthalate with ethylene glycol, so as to produce a dispersoid consisting of calcium phosphate particles, and the resultant ester-interchange reaction product was converted to a polyester resin having an intrinsic viscosity of 0.640.

The resultant dispersoid satisfied the relationship (I).

Sample D was prepared by the same process as that for Sample A, except that the dispersoid was prepared by adding the amount indicated in FIGS. 5 and 6 of colloidal silica particles having an average primary particle size of about 50 millimicrons to the ester-interchange reaction mixture.

Sample E was prepared by the same process as that for Sample D, except that the colloidal silica particles were replaced by titanium dioxide particles having an average primary particle size of 0.32 microns.

Referring to FIG. 5, in Sample A, the addition of the dispersoid of the present invention clearly caused the temperature-lowering crystallization temperature of the polyester composition to remarkably decrease, whereas in Samples D and E, the addition of colloidal silica and titanium dioxide particles resulted in slight increase in the temperature-lowering crystallization temperature thereof.

FIG. 6 shows that in Sample A, the DSC temperature-lowering crystallization peak area ratio of the polyester composition decreased with the increase of the amount of the dispersoid of the present invention, whereas in Samples D and E, the DSC temperature-lowering crystallization peak area ratios of the polyester compositions increased with the increase of the amount of the colloidal silica and titanium dioxide particles.

From the results indicated in FIGS. 5 and 6, the specific dispersoid of the present invention is highly effective for increasing the melt viscosity of the polyester composition at a low shearing rate and, therefore, for restricting orientation and crystallization of the polyester molecular chains. In the relationship (I), the item:

$$-\frac{(\eta\dot{\gamma}_1(w) - \eta\dot{\gamma}_1(0)) - (\eta\dot{\gamma}_2(w) - \eta\dot{\gamma}_2(0))}{\dot{\gamma}_1 - \dot{\gamma}_2}$$

refers to an absolute average variation of the increase in the melt viscosity of the polyester composition containing the dispersoid between a low shearing rate $\dot{\gamma}_1 = 0.01$ sec$^{-1}$ and a high shearing rate $\dot{\gamma}_2 = 5.0$ sec$^{-1}$. Hereinafter, this item will be referred to as the melt viscosity increase parameter.

The relationship between the melt viscosity increase parameter and the dispersoid content is variable depending on the type of the dispersoid. That is, the size, surface condition, and surface electric property of the dispersoid particles, electric property of interface between the dispersoid particles and the polyester resin matrix, and the network or agglomeration structure formed by the dispersoid particles and the polyester molecular chains.

In order to confirm the above-mentioned relationship, the melt viscosity increase parameters of a number of different polyester compositions were determined.

Sample A was the same as mentioned above, and satisfied the relationship (I).

Sample B was prepared in the same manner as that for Sample A, except that the amount of tetraethylammonium hydroxide was 0.7 molar % based on the molar amount of the isopropyl acid phosphate used, and satisfied the relationship (I).

Sample C was prepared in the same manner as that for Sample A, except that no tetramethylammonium hydroxide was used, and this sample did not satisfy the relationship (I).

Samples D and E are the same as mentioned above, and also did not satisfy the relationship (I).

Figure 7:
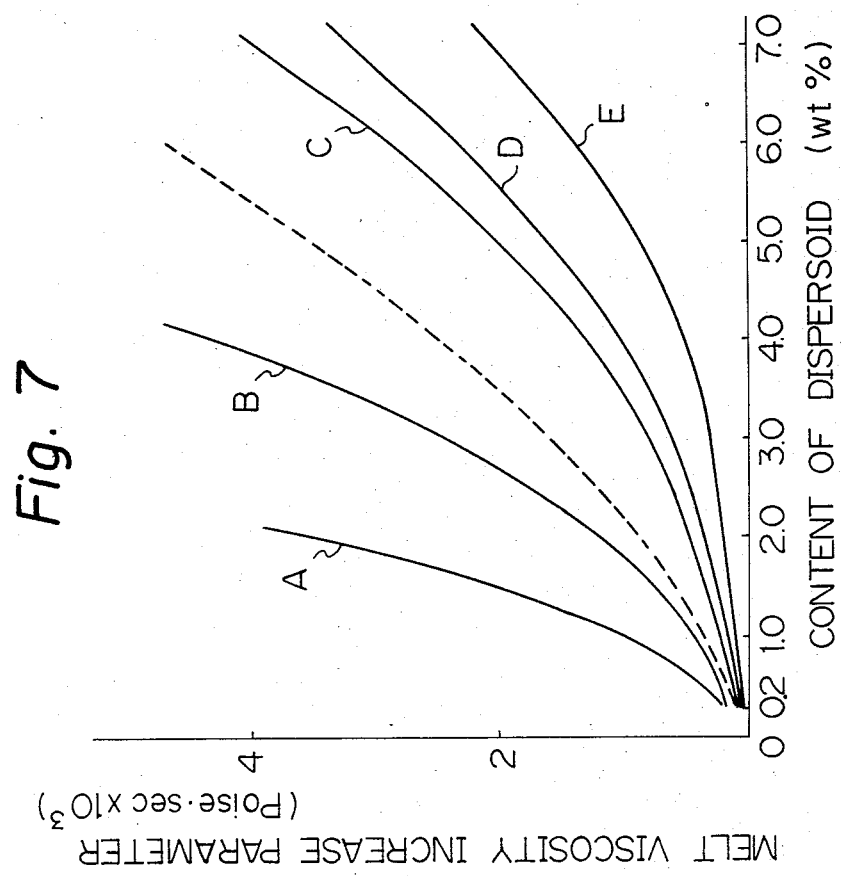
FIG. 7 is a diagram showing a relationship between the content of the dispersoid in the matrix polyester resin and the melt viscosity-increase parameter.

The relationship between the content of dispersoid and the melt viscosity increase parameter, for each sample, is indicated in FIG. 7. In FIG. 7, the dotted line shows the relationship (I) wherein the left side is equal to the right side.

It was confirmed that when Sample D or E, which was far from satisfying the relationship (I), was subjected to a high speed melt-spinning process, there were many breakages of the resultant filaments at a spinning speed of from 5000 m/min to 6000 m/min, and the melt-spinning operation could not be continuously carried out.

In the high speed melt-spinning process applied to Sample C, which fall outside of but close to the relationship (I), many breakages of the melt-spun filaments occurred at a spinning speed of from 6000 to 7000 m/min.

In Samples A and B, the high speed melt-spinning process applied thereto could be smoothly carried out without difficulty, even at a high spinning speed of 5000 m/min or more.

In order to confirm the effect of the dispersoid of the present invention on the restriction of orientation and crystallization of the polyester molecular chains, the following experiments were carried out.

Sample F was prepared by the same manner as that used for Sample A, except that no dispersoid was dispersed in the polyester resin matrix.

Sample G was prepared by the same manner as that applied to Sample A, except that trimethyl phosphate was used in place of the isopropyl acid phosphate and satisfied the relationship (I).

Each sample was subjected to a high speed melt-spinning process at spinning speeds of 4000 m/min, 5000 m/min, and 7000 m/min.

Each melt spin filament was subjected to measurement of the density and birefringence ($\Delta n$) thereof.

Figure 8:
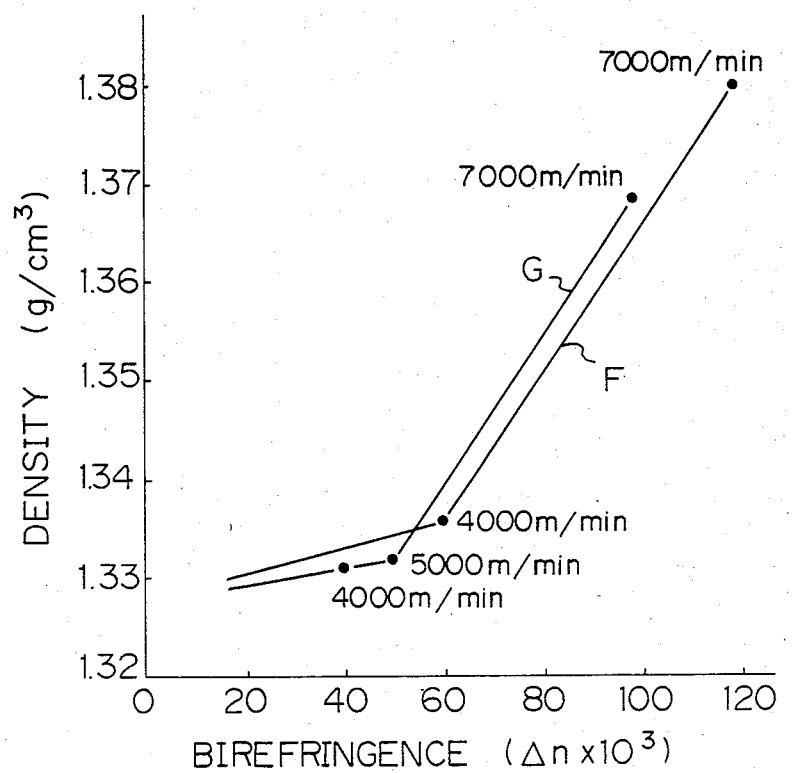
FIG. 8 is a diagram showing a relationship between the birefringence (Δn) of the polyester composition and the density of the polyester fiber.

The results are shown in FIG. 8. Referring to FIG. 8, it is clear that when melt-spun at the same spinning speed, the filaments from Sample G containing the specific dispersoid of the present invention exhibit lower birefringence ($\Delta n$) and density than those of the filaments from Sample F containing no dispersoid. Also, FIG. 8 shows that the birefringences and densities of the filaments from Sample F remarkably increased at a spinning speed of 4000 m/min or more, whereas those of the filaments from Sample G increased remarkably at a spinning speed of 5000 m/min.

This phenomenon clearly indicates that, when Sample G is melt-spun at a high speed, the specific dispersoid served to restrict the orientation and crystallization of the polyester molecular chain.

The polyester composition of the present invention is highly adequate for high speed melt-spinning process. The term "high speed" used herein refers to a melt-spinning speed of 5000 m/min or more. Usually, the high speed melt-spinning process is carried out at a speed of from 5000 to 9000 m/min. A high speed of more than 9000 m/min is not practical. The melt-spinning process is carried out usually at an extrusion temperature of from 260° to 330° C., preferably from 270° C. to 320° C. There is no limitation to the size and cross-sectional profile of melt-spinning nozzle. That is, the cross-sectional profile of the nozzle may be regular or irregular, that is triangular, tetrazonal, Y-shaped, or cross-shaped, or hollow. Also, there is no limitation to the cross-sectional area of the spinning nozzle. When the cross-sectional profile is regular, the cross-sectional diameter of the nozzle is usually in the range of from 0.005 mm to 2 mm.

The melt of the polyester composition is extruded through the melt-spinning nozzle, the resultant filamentary streams of the melt is cooled with a cooling medium, for example, air, nitrogen gas, and steam. Usually the cooling medium is blown to the filamentary streams concurrently or transversally with the movement of the filamentary streams.

The temperature of the cooling medium is usually in the range of from $-20°$ C. to $150°$ C. The blowing speed of the cooling medium is controlled to an extent that the filamentary streams are not excessively disturbed. If necessary, the temperature of the cooling medium atmosphere may be locally controlled by using a heating chimney.

The cooled and solidified filaments are subjected to desired procedures, for example, oiling, twisting, texturing, or other procedures.

As is mentioned above, the polyester composition of the present invention exhibits a special melt viscosity behavior such that, when melt-spun at a high speed, the orientation and crystallization of the polyester molecular chains are remarkably restricted, and therefore, the composition has a remarkably improved high speed melt-spinning property and an excellent extremely fine fiber-forming property.

Also, the polyester composition of the present invention exhibits a highly enhanced film-forming property and is useful for producing extremely thin polyester film. The thin films produced from the polyester composition of the present invention exhibit a high transparency and a superior smoothness and therefore, are useful as base films of magnetic tapes for audio, video, and computer purposes, as base films of magnetic recording sheet, for example, floppy disk, as base films of photographic films, graphic arts, stamping foils, fancy yarns, for example, gold and silver threads, and insulating films for electrc devices, for example, condensers.

Furthermore, the polyester composition of the present invention has an improved molding property and is useful for a hollow molding process at a high shearing rate.

SPECIFIC EMBODIMENTS

In order to more thoroughly illustrate the present invention and its relationship to the prior art, the following examples and comparative examples are presented.

In the examples, the intrinsic viscosity $[\eta]$ of a polyester composition was determined in a solvent consisting of orthochlorophenol at a temperature of $35°$ C.

The melt viscosity of a polyester composition was measured by using a coaxial double-cylinder type thixotometer in accordance with an usual method. A liquid sample to be tested was placed in the space between the outer cylinder and inner cylinder, the outer cylinder was rotated at a predetermined angular velocity. An angular movement of the inner cylinder at which a torque applied to the inner cylinder from the rotation of the outer cylinder through the liquid sample is balanced with a resistance torque produced on a wire located in the top portion of the inner cylinder, was measured. The measured angular movement value as converted to a melt viscosity of the liquid sample and a shearing rate applied to the liquid sample, in accordance with the following equations:

$$\dot{\gamma} = \frac{2 r_a \Omega}{(r_a^2 - r_b^2)}$$

-continued $$\eta = \frac{k\theta}{4\pi h \Omega} \left( \frac{1}{r_b^2} - \frac{1}{r_a^2} \right)$$

wherein $\dot{\gamma}$ represents a shearing rate applied to the liquid sample, $\eta$ represents a melt viscosity of the liquid sample, $r_a$ represents a radius of the outer cylinder, $r_b$ represents a radius of the inner cylinder, h represents a depth of the layer of the liquid sample, $\Omega$ represents an angular velocity of the outer cylinder, k represent a torsion constant of the wire attached to the inner cylinder, and $\theta$ represents an angular movement of the inner cylinder.

In the measurement, $r_a$ was 1.1 cm, $r_b$ was 0.9 cm, h was 7.1 cm, k was $2.05 \times 10^5$ dyne·cm/deg, and the angular velocity of the outer cylinder was adjusted to a value at which the shearing rate $\dot{\gamma}$ was in the range of from $1.0 \times 10^{-2}$ sec$^{-1}$ to $1.0 \times 10^2$ sec$^{-1}$.

The polyester composition to be tested, which was in the form of chips having a length of 4 mm, a width of 4 mm, and a thickness of 2 mm, was heated to a temperature of $285°$ C. under a high vacuum of 1 mmHg, was maintained at this temperature for 20 minutes, was cooled to a temperature of $275°$ C. for 3 minutes while the vacuum was maintained at the above-mentioned value while the sample was protected from oxidation thereof, was maintained at $275°$ C. for 17 minutes, was kept standing in a nitrogen gas atmosphere under a pressure of 2 kg/cm$^2$ for 20 minutes, while a Weissenberg effect on the liquid sample is prevented, and thereafter, the sample was subjected to measurement.

After the measurement was completed, the intrinsic viscosity of the used sample was measured in a solvent consisting of orthochlorophenol at $35°$ C., and the measured intrinsic viscosity value was compared with that of the original sample, to determine the degree of heat decomposition of the sample. It was found that the intrinsic viscosity of the sample decreased by only 0.002, which was negligible. The decrease in the intrinsic viscosity was always constant and the reproductivity of the measured value of the melt viscosity was good.

The high speed melt-spinning property of a polyester composition was determined by the following process.

About 100 kg of a polyester composition was dried by a usual drying method, and was melt-spun through a melt-spinning nozzle having 36 holes each having a diameter of 0.35 mm and a regular (circular) cross-sectional profile, at a spinning temperature of $300°$ C. at an extruding rate of 49 g/min. The resultant filaments were taken up at a speed of 6000 m/min. The number of breakages of the filaments derived from 100 kg of the polyester composition was counted and used to represent the high speed melt-spinning property of the polyester composition. The resultant filaments were of a yarn count of 75 deniers/36 filaments and were subjected to measurements of tensile strength and ultimate elongation thereof.

The birefringence ($\Delta$n) of the filaments was measured by means of a polarization microscope under a light source of Na-$\theta$ rays (wavelength=589 millimicrons) by using a Beleck's compensator.

The density of the filaments was determined at a temperature of $25°$ C. by using a tetrachloromethane-n-heptane type density gradient tube.

The average size of dispersoid particles and the largest size of secondary agglomerates were determined by means of a transmission type electron microscope.

EXAMPLES 1 TO 4 AND COMPARATIVE EXAMPLE 1

In each of Examples 1 to 4 and Comparative Example 1, an ester-interchange reactor was charged with 100 parts by weight of dimethyl terephthalate 60 parts by weight of ethylene glycol and 0.06 parts by weight of calcium acetate (corresponding to 0.066 molar % based on the molar amount of the dimethyl terephthalate used). The charged mixture was heated to a temperature of 140° C. to 220° C. over 3 hours in a nitrogen gas atmosphere for the ester-interchange reaction, while discharging the by-product consisting of methyl alcohol from the reactor.

Separately, 0.5 parts by weight of trimethyl phosphate (corresponding to 0.693 molar % based on the molar amount of the dimethyl terephthalate used) were reacted with 0.31 parts by weight of calcium acetate monohydrate (corresponding to ½ molar times the molar amount of trimethyl phosphate) in 8.5 parts by weight of ethylene glycol at a temperature of 120° C. for 60 minutes while refluxing, to prepare 9.31 parts by weight of a clear solution containing the resultant calcium phosphate diester. A clear mixture solution was prepared by dissolving 0.57 parts by weight of calcium acetate monohydrate (corresponding to 0.9 molar times the molar amount of the trimethyl phosphate) and tetraethylammonium hydroxide in the amount indicated in Table 1, in 9.31 parts by weight of the calcium phosphate diester clear solution at room temperature.

The clear mixture solution was admixed with the ester-interchange reaction product and then with 0.06 parts by weight of a polycondensation catalyst consisting of antimony trioxide. The resultant reaction mixture was heated to a temperature of 240° C. while ethylene glycol was evaporated and discharged from the reactor. The reaction mixture was placed in a polymerization reactor. The inside pressure in the polymerization reactor was reduced from 760 mmHg to 1 mmHg over one hour while the temperature of the reaction mixture was raised from 240° C. to 280° C. over 1.5 hours. The reaction mixture was heated at a temperature of 280° C. under a reduced pressure of 1 mmHg for 3 hours. That is, the reaction mixture was subjected to polycondensation reaction for the entire time of 4.5 hours.

The resultant polyester composition contained 0.5% by weight of dispersoid consisting of calcium phosphate and exhibited the intrinsic viscosity [η], melt viscosity increase parameter, and high speed melt-spinning property as indicated in Table 1.

The resultant polyester composition was subjected to a high speed melt-spinning process at a spinning speed of 6000 m/min.

The resultant filaments exhibited the tensile strength, ultimate elongation, birefringence (Δn), and density as indicated in Table 1.

EXAMPLES 5 TO 8 AND COMPARATIVE EXAMPLE 2

In each of Examples 5 to 8 and Comparative Example 2, the same procedures as those described in Example 1 were carried out except that trimethyl phosphate, calcium acetate monohydrate and tetraethylammonium hydroxide were used in the amounts indicated in Table 1. The resultant polyester composition contained from 0.1 to 3% by weight of dispersoid. The results are shown in Table 1.

EXAMPLE 6 AND COMPARATIVE EXAMPLE 3

In each of Example 6 and Comparative Example 3, the same procedures as those described in Example 1 were carried out, except that the ester-interchange reaction product was mixed with a clear solution of tetraethylammonium hydroxide in the amount indicated in Table 1 dissolved in 4.32 parts by weight of an ethylene glycol solution containing 10% of calcium acetate monohydrate, and, 5 minutes thereafter, with 0.52 parts by weight of isopropyl acid phosphate. The resultant polyester composition contained 0.50% by weight of dispersoid. The results are shown in Table 1.

The resultant filaments were treated with an aqueous solution of sodium hydroxide at the boiling temperature thereof to an extent that the weight of the filaments decreased to about 80% of the original weight thereof. The transmission type electron microscopic cross-sectional profiles of the filament of Comparative Example 3 are shown in FIG. 1 (×10,000) and FIG. 2 (×24,000).

Also, the transmission type electron microscopic cross-sectional profiles of the filament of Example 9 are shown in FIG. 3 (×10,000) and FIG. 4 (×24,000).

EXAMPLE 10

The same procedures as those carried out in Example 6 were repeated, except that after a polycondensation catalyst consisting of antimony trioxide was added, 1.42 parts by weight of p-hydroxybenzoic acid (corresponding to 2 molar % based on the molar amount of dimethyl terephthalate used) were added to the ester-interchange reaction product.

The results are shown in Table 1.

EXAMPLE 11

The same procedures as those described in Example 10 were carried out except that 1.42 parts by weight of p-hydroxybenzoic acid were replaced by 0.71 parts by weight of p-hydroxybenzoic acid (corresponding to 1 molar % based on the molar amount of dimethyl terephthalate used) and 0.93 parts by weight of p-acetoxybenzoic acid (corresponding to 1 molar % based on the molar amount of dimethyl terephthalate used).

The results are shown in Table 1.

EXAMPLE 12

An ester-interchange reactor was charged with 100 parts by weight of dimethyl terephthalate, 60 parts by weight of ethylene glycol, 0.06 parts by weight of calcium acetate (corresponding to 0.066 molar % based on the molar amount of the dimethyl terephthalate used), and 0.04 parts by weight of a polycondensation catalyst consisting of antimony trioxide. The charged mixture was heated to a temperature of 140° C. to 230° C. over 4 hours in a nitrogen gas atmosphere for the ester-interchange reaction while the by-product consisting of methyl alcohol was discharged from the reactor.

Separately, 0.06 parts by weight of tetra-n-butylphosphonium chloride (corresponding to 10.9 molar % based on the molar amount of isopropyl acid phosphate which will be described below) were dissolved in 2.68 parts by weight of an ethylene glycol solution containing 10% of calcium acetate monohydrate, to prepare a clear solution. The ester-interchange reaction product was mixed with the clear solution and, 5 minutes thereafter, with 0.3 parts by weight of isopropyl acid phosphate. The resultant reaction mixture was heated to a temperature of 240° C. while ethylene glycol was evaporated and discharged from the reactor. The reaction mixture was placed in a polymerization reactor.

Next, the reaction mixture was further mixed with 3.1 parts by weight of a cation dye-dyeing property-promoting copolymerization component consisting of sodium 3.5-di($\beta$-hydroxyethoxycarbonyl)benzene sulfonate (corresponding to 1.7 molar % based on the molar amount of dimethyl terephthalate used) and 0.112 parts by weight of an etherifation retarder consisting of sodium acetate trihydrate (corresponding to 0.16 molar % based on the molar amount of dimethyl terephthalate used).

The inside pressure in the polymerization reactor was reduced from 760 mmHg to 1 mmHg over one hour while the temperature of the reaction mixture was raised from 240° C. to 280° C. over 1.5 hours. The reaction mixture was heated at a temperature of 280° C. under a reduced pressure of 1 mmHg for 2.5 hours. That is, the reaction mixture was subjected to polycondensation reaction for the entire time of 4.0 hours.

The resultant polyester composition contained 0.30% by weight of dispersoid. The results are shown in Table 1.

The melt viscosity increase parameter indicated in Table 1, Example 12, was determined from the melt viscosity of a polyester composition which was prepared by the same procedures as those described above, except that the cation dye-dyeing property-promoting polymerization component and the etherification retardant were not added to the reaction mixture, and which had an intrinsic viscosity of 0.640.

COMPARATIVE EXAMPLE 4

The same ester-interchange reaction procedures as those described in Example 1 were carried out except that when the temperature of the reaction mixture reached 170° C., colloidal silica having an average primary particle size of 50 millimicrons was added in an amount, in terms of silicon dioxide, corresponding to 0.5% by weight based on the weight of the resultant polyester resin. The colloidal silica was in a concentration of 10% in a medium consisting of ethylene glycol.

After the ester-interchange reaction was completed, the reaction product was mixed with 0.05 parts by weight of trimethyl phosphate (corresponding to 0.069 molar % based on the molar amount of dimethyl terephthalate) and 0.04 parts by weight of antimony trioxide. The reaction mixture was heated to a temperature of 240° C., while ethylene glycol was evaporated and discharged from the reactor. The reaction mixture was placed in a polymerization reactor. The inside pressure in the polymerization reactor was reduced from 760 mmHg to 1 mmHg over one hour while the temperature of the reaction mixture was raised from 240° C. to 280° C. over 1.5 hours. The reaction mixture was heated at a temperature of 280° C. under a reduced pressure of 1 mmHg for 3 hours. That is, the reaction mixture was subjected to polycondensation reaction for the entire time of 4.5 hours.

The resultant polyester resin exhibited an intrinsic viscosity of 0.640 and a softening point of 262° C. The other results are shown in Table 1.

COMPARATIVE EXAMPLE 5

The same ester-interchange reaction procedures as those described in Comparative Example 4 were carried out, except that the colloidal silica was replaced by calcium phosphate having an average primary particle size of 300 millimicrons, and in the form of an ethylene glycol solution thereof in a concentration of 10%. The amount of the calcium phosphate was 0.5% by weight based on the weight of the resultant polyester resin.

The ester-interchange reaction product was subjected to the same polycondensation procedures as those described in Comparative Example 4. The resultant polyester resin exhibited an intrinsic viscosity of 0.640 and a softening point of 262° C.

The results are shown in Table 1.

COMPARATIVE EXAMPLE 6

The same procedures as those described in Comparative Example 4 were carried out, except that no colloidal silica was added to the ester-interchange reaction mixture.

The resultant polyester resin exhibited an intrinsic viscosity of 0.640 and a softening point of 262° C. The results of the measurements are shown in Table 1.

TABLE 1

| Example No. | Copolymerization component | Phosphorus compound Type | Phosphorus compound Amount (Part by wt) | Ca compound Amount added Before EI reaction (part by wt) | Ca compound Amount added After EI reaction (part by wt) | Ca/P E.N/M.A | Dispersing agent (Part by wt) | Average particle and agglomerate size (mμ) | Largest size of agglomerates (mμ) | Intrinsic viscosity | Melt viscosity increase parameter (Poise·sec) | Critical value of melt viscosity increase parameter (Poise·sec) | Rate of recurrence of breakage of filaments (Times/100 kg) | Tensile strength (g/d) | Ultimate elongation (%) | Δn ×10³ | Density (g/cm³) |
|---|---|---|---|---|---|---|---|---|---|---|---|---|---|---|---|---|---|
| Comparative Example 1 | None | Trimethyl phosphate | 0.5 | 0.06 | 0.88 | 1.5 | 0 | 50 | 100 | 0.640 | *100 | 200 | 8 | 3.8 | 75 | 92 | 1.365 |
| Example 1 | " | Trimethyl phosphate | " | " | " | " | 0.0008 | 20 | 50 | 0.640 | 230 | 200 | 2 | 3.9 | 90 | 80 | 1.356 |
| 2 | " | Trimethyl phosphate | " | " | " | " | 0.0038 | 10 | 40 | 0.640 | 250 | 200 | 2 | 4.1 | 90 | 78 | 1.354 |
| 3 | " | Trimethyl phosphate | " | " | " | " | 0.0075 | 8 | 40 | 0.640 | 280 | 200 | 0 | 3.9 | 92 | 78 | 1.353 |
| 4 | " | Trimethyl phosphate | " | " | " | " | 0.015 | 5 | 30 | 0.640 | 300 | 200 | 0 | 4.3 | 96 | 75 | 1.351 |
| Comparative Example 2 | " | Trimethyl phosphate | 0.1 | " | 0.12 | " | 0.006 | 5 | 25 | 0.640 | *55 | 70 | 8 | 3.6 | 70 | 102 | 1.367 |
| Example 5 | " | Trimethyl phosphate | 0.2 | " | 0.31 | " | 0.012 | 6 | 27 | 0.640 | 150 | 100 | 0 | 3.9 | 80 | 88 | 1.359 |
| 6 | " | Trimethyl phosphate | 0.3 | " | 0.50 | " | 0.018 | 5 | 30 | 0.640 | 210 | 130 | 0 | 4.2 | 83 | 83 | 1.352 |
| 7 | " | Trimethyl phosphate | 1.0 | " | 1.82 | " | 0.06 | 5 | 28 | 0.640 | 1500 | 400 | 0 | 3.9 | 101 | 71 | 1.346 |
| 8 | " | Trimethyl phosphate | 3.0 | " | 5.59 | " | 0.18 | 6 | 26 | 0.640 | 6000 | 1600 | 2 | 3.8 | 113 | 65 | 1.347 |
| Comparative Example 3 | " | Isopropyl acid phosphate | 0.52 | " | 0.793 | " | 0 | 55 | 107 | 0.640 | *145 | 200 | 7 | 3.7 | 72 | 95 | 1.366 |
| Example 9 | " | Isopropyl acid phosphate | " | " | " | " | 0.03 | 6 | 30 | 0.640 | 250 | 200 | 1 | 4.3 | 91 | 81 | 1.350 |
| 10 | POBA 2 molar % | Trimethyl phosphate | 0.3 | " | 0.50 | " | 0.018 | 5 | 27 | 0.635 | (210) | 130 | 0 | 4.3 | 93 | 82 | 1.353 |
| 11 | POBA 1 molar % BABA 1 molar % | Trimethyl phosphate | " | " | " | " | 0.018 | 6 | 25 | 0.632 | (210) | 130 | 0 | 4.4 | 90 | 81 | 1.351 |
| 12 | Na-BS 1.7 molar % | Isopropyl acid phosphate | " | " | 0.268 | 1.0 | 0.06 | 7 | 35 | 0.585 | 200 | 130 | 1 | 3.8 | 95 | 75 | 1.348 |
| Compara- | | | | | | | | | | | | | | | | | |

TABLE 1-continued

| Example No. | Copolymerization component | Phosphorus compound Type | Phosphorus compound Amount (Part by wt) | Ca compound Amount added Before El reaction (part by wt) | Ca compound Amount added After El reaction (part by wt) | Ca/P E.N/M.A | Dispersing agent (Part by wt) | Average particle and agglomerate size (mμ) | Largest size of agglomerates (mμ) | Intrinsic viscosity | Melt viscosity increase parameter (Poise·sec) | Critical value of melt viscosity increase parameter (Poise·sec) | High speed melt-spinning property Rate of recurrence of breakage of filaments (Times/100 kg) | Tensile strength (g/d) | Ultimate elongation (%) | $\Delta n \times 10^3$ | Density (g/cm$^3$) |
|---|---|---|---|---|---|---|---|---|---|---|---|---|---|---|---|---|---|
| tive Example | | | | | | | | | | | | | | | | | |
| 4 | None | Colloidal silica 0.5% in terms of SiO$_2$ | | | | | | 300 | 1000 | 0.640 | *80 | 200 | 10 | 4.0 | 68 | 110 | 1.375 |
| 5 | " | Calcium phosphate 0.5% | | | | | | 500 | 1700 | 0.640 | *50 | 200 | 15 | 3.5 | 92 | 80 | 1.352 |
| 6 | " | None | | | | | | — | — | 0.640 | 0 | — | 19 | 3.8 | 66 | 113 | 1.378 |

In Table 1, EI represents ester-interchange reaction; Ca/P, E.N./M.A. represents a ratio of the amount in equivalent number of calcium contained in the dispersoid-forming components to the amount in molar amount of phosphorus contained in the dispersoid-forming components, POBA represents p-hydroxybenzoic acid, PABA represents p-acetoxybenzoic acid, and Na-BS represents sodium 3,5-di($\beta$-hydroxyethoxycarbonyl)benzene sulfonate. Also, in Table 1, * indicates that the value of the melt viscosity increase parameter does not satisfy the relationship (I). Furthermore, in Table 1, the term "Critical value of melt viscosity increase parameter" refers to a melt viscosity increase parameter value which is equal to the value of $83w^2+275w+42$, which is the right side item of the relationship (I).

We claim:
1. A polyester composition comprising:
(A) 100 parts by weight of a matrix polyester resin comprising at least 80 molar % of recurring ethylene terephthalate unit of the formula:

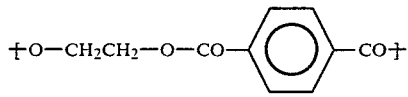

and
(B) 0.2 to 7 parts by weight of a dispersoid in the form of primary fine solid particles and/or secondary agglomerates each consisting of a plurality of said primary fine particles, dispersed in said matrix polyester resin, said dispersoid being such that, when said dispersoid is contained in a predetermined amount in a typical matrix polyester resin consisting of a polyethylene terephthalate having an intrinsic viscosity of 0.640, the resultant exemplary polyester composition satisfies the relationship (I):

$$-\frac{(\eta\dot\gamma_1(w) - \eta\dot\gamma_1(0)) - (\eta\dot\gamma_2(w) - \eta\dot\gamma_2(0))}{\dot\gamma_1 - \dot\gamma_2} \geq 83w^2 + 275w + 42 \qquad (I)$$

wherein w represents the amount in % by weight of said dispersoid based on the entire weight of said exemplary polyester composition; $\dot\gamma_1$ and $\dot\gamma_2$ represent shearing rates of 0.01 sec$^{-1}$ and 5.0 sec$^{-1}$, respectively; $\eta\dot\gamma_1(w)$ and $\eta\dot\gamma_2(w)$ represent melt viscosities in poise (1/10 N·sec·m$^{-2}$) of said exemplary polyester composition containing w % by weight of said dispersoid, determined at shearing rates of $\dot\gamma_1$ and $\dot\gamma_2$, respectively; $\eta\dot\gamma_1(0)$ and $\eta\dot\gamma_2(0)$ represent melt viscosities in poise (1/10 N·sec·m$^{-2}$) of said matrix polyester resin free from said dispersoid, determined at shearing rates of $\dot\gamma_1$ and $\dot\gamma_2$, respectively.

2. The polyester composition as claimed in claim 1, wherein said primary fine solid particles and secondary agglomerates have an average size corresponding to $\frac{1}{3}$ or less of the average length of said polyester molecular chains in said matrix polyester resin, and said dispersoid contains no large secondary agglomerates having a size corresponding to $\frac{1}{2}$ or more of the average length of polyester molecular chains in said matrix polyester resin.

3. The polyester composition as claimed in claim 1, wherein said dispersoid comprises at least one inorganic substance.

4. The polyester composition as claimed in claim 1, wherein said dispersoid is formed in such a manner that, in at least one stage of procedures for producing said matrix polyester resin, the reaction mixture is admixed with a mixture of (a) at least one phosphorus compound of the formula (II):

wherein $R^1$ and R represent, independently from each other, a member selected from the group consisting of a hydrogen atom and monovalent organic radicals, respectively, X represents a member selected from the group consisting of a hydrogen atom, monovalent organic radicals, and metal atoms, and n represents zero or 1; (b) at least one alkaline earth metal compound in an amount such that the sum of the equivalent numbers of the metals contained in the above-mentioned phosphorus compound (a) and alkaline earth metal compound (b) is in the range of from 2.0 times to 3.2 times the molar amount of the phosphorus compound (a); and (c) a dispersing agent consisting of at least one member selected from the group consisting of quaternary ammonium compounds and quaternary phosphonium compounds, and in an amount of 0.01 to 35 molar % based on the molar amount of said phosphorus compound (a).

5. The polyester composition as claimed in claim 1, wherein said matrix polyester resin has an intrinsic viscosity of 0.300 or more.

* * * * *